United States Patent [19]

Trunnell

[11] 4,063,980
[45] Dec. 20, 1977

[54] METHOD OF MAKING A PRESS-FIT PIPE JOINT

[76] Inventor: Harold K. Trunnell, Shaw Island, Wash. 98286

[21] Appl. No.: 578,902

[22] Filed: May 19, 1975

[51] Int. Cl.² .......................................... B23P 19/02
[52] U.S. Cl. .................................. 156/165; 29/525;
156/212; 156/294; 156/295; 156/309; 156/330; 264/249; 285/382; 285/382.4
[58] Field of Search ............... 285/382, 382.4, 332, 285/399, 417, 329, DIG. 16, 294; 29/525; 156/293, 294, 324, 165, 291, 295, 305, 309, 313, 196, 212, 330, 215, 160; 264/229, 249, 292, 320; 428/139, 137, 246, 247, 255

[56] References Cited

U.S. PATENT DOCUMENTS

| | | | |
|---|---|---|---|
| 406,140 | 7/1889 | Howell | 285/329 |
| 954,549 | 4/1910 | Turner | 285/329 X |
| 2,273,154 | 2/1942 | Stromsoe | 285/332 |
| 2,992,457 | 7/1961 | Harrison | 156/294 |
| 2,998,269 | 8/1961 | Houghton | 285/DIG. 16 |
| 3,211,091 | 10/1965 | Garrett | 156/313 |
| 3,466,066 | 9/1969 | Dawson | 29/525 |
| 3,466,738 | 9/1969 | Mount | 285/382.4 X |
| 3,476,413 | 11/1969 | Coberly et al. | 29/525 |
| 3,872,573 | 3/1975 | Nichols | 29/525 |
| 3,916,502 | 11/1975 | Bagnulo | 285/294 |
| 4,028,156 | 6/1977 | Clark et al. | 156/215 |

Primary Examiner—William A. Powell
Assistant Examiner—Jerome W. Massie
Attorney, Agent, or Firm—Kolisch, Hartwell, Dickinson & Stuart

[57] ABSTRACT

An improved press-fit joint between a pipe, such as a length of pipe forming part of a section of pipeline in an irrigation system, and a pipe coupler used in connecting the ends of adjacent pipeline sections in the system. In forming the joint, a sheathing element of thin gauge material is mounted on an end portion of the pipe. The sheathing element includes a skirt portion which bounds the inner circumference of the pipe, allowing a tubular portion of the coupler to be pressed into the end of the pipe without experiencing the galling which normally occurs when the pipe and coupler are both made of a metal such as aluminum. In addition, the sheathing element may be provided with openings for carrying an adhesive bonding agent into the interface region of the joint. A method of making a joint between a length of pipe and another part such as a coupler.

7 Claims, 5 Drawing Figures

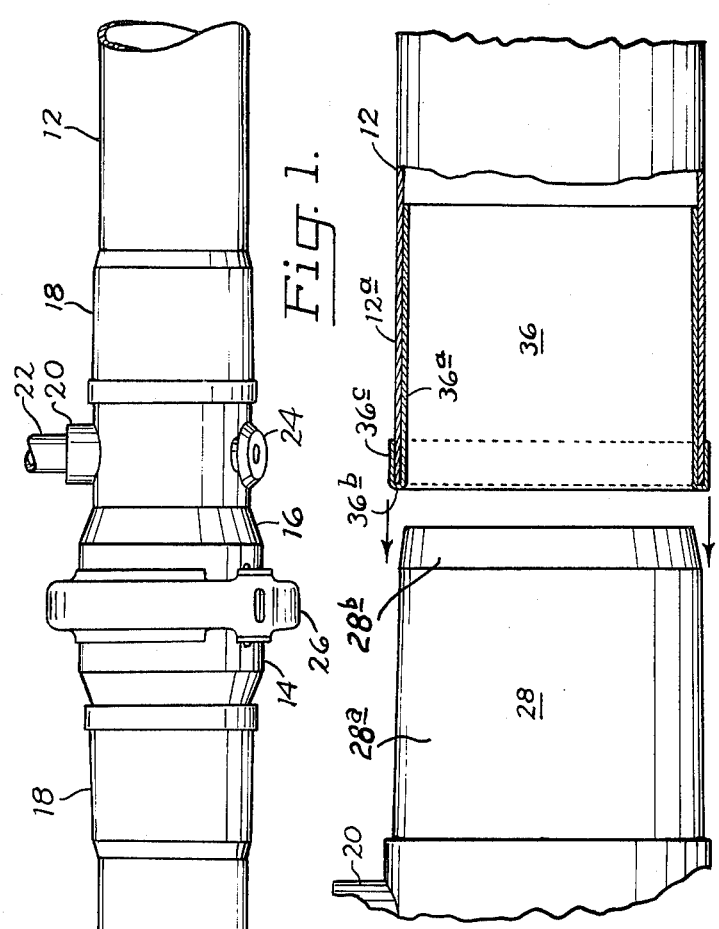
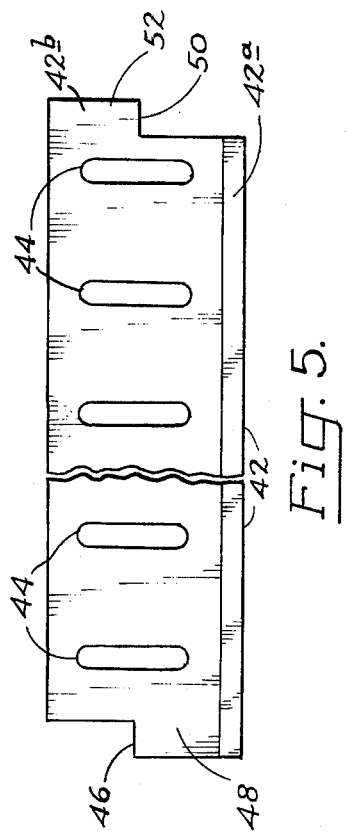
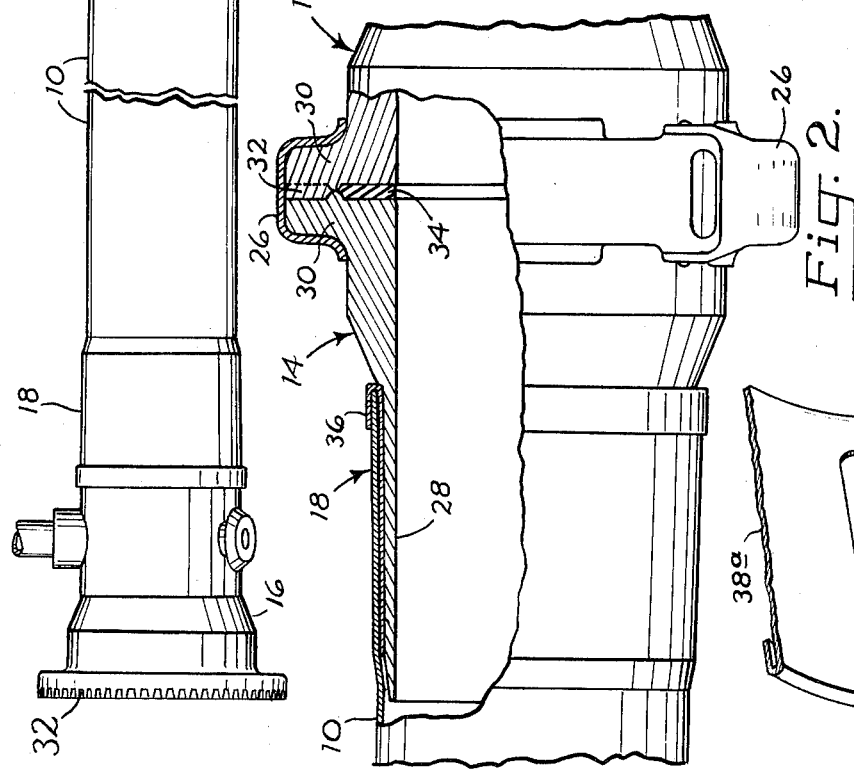
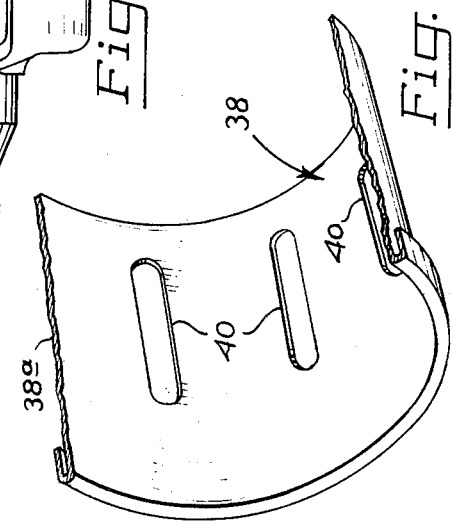

METHOD OF MAKING A PRESS-FIT PIPE JOINT

BACKGROUND AND SUMMARY

The present invention relates to press-fit pipe joints, and to methods for making such joints. More specifically, the invention concerns press-fit joints prepared between a length of pipe and another part such as a pipe coupler, where both are composed of a metal which tends to gall under the high pressure conditions existing when making a press fit.

The invention is illustrated herein as it is applied in forming rigid joints between the ends of a length of pipe and couplers connected to such ends to produce a section of pipeline in an irrigation system.

In one form of field irrigation system, multiple sections of pipeline disposed end-to-end are coupled together to produce a continuous expanse of pipe. Wheel structures are provided at intervals along the length of this expanse to support it above the ground, and these are rolled over the ground when repositioning the pipeline in the field being irrigated. In some irrigation systems, power for driving the wheel structures is transmitted through the pipeline itself, and such pipeline in some installations may have considerable length. This means that any joint between a length of pipe and the coupler used to couple the pipe length with an adjacent length of pipe must be capable of reliably transmitting a driving torque of appreciable magnitude. Furthermore, the pressure of the water within the line must be contended with. Obviously, any weakness in a pipe-to-coupler joint will seriously affect the reliability of the irrigation system.

A pipe coupler typically may take the form of a cast aluminum body including a tubular portion at one end which is press fit into the end of a length of pipe to form a joint between them. As is well known, galling occurs when parts composed of certain metals are rubbed against each other under conditions of high pressure, and such metals as aluminum and titanium, and alloys thereof, are especially vulnerable in this regard. Thus, in attempting to press fit a length of aluminum pipe onto a coupler, galling oftentimes will interfere with the obtaining of a proper seated relationship, or will result in the pipe being damaged or severely weakened.

A general object of the present invention, therefore, is to provide an improved press-fit pipe joint which takes care of the above-identified problems in a practical and satisfactory manner.

A more specific object of the invention is to provide means for forming a rigid, press-fit between a length of pipe and a coupler, where the pipe and coupler are of a metal which tends to gall under the conditions existing when making a press fit.

According to a preferred embodiment of the invention, a sheathing element of thin gauge plastic or metal, which exhibits little tendency to gall, is fitted over the end of a length of pipe. The sheathing element includes an inner skirt portion which bounds the inner circumference of the pipe and allows the coupler to be forced into the end of the length of pipe without the galling problems normally experienced.

BRIEF DESCRIPTION OF THE DRAWINGS

Various objects and advantages of the present invention will become more fully apparent as the following description is read in conjunction with the accompanying drawings, wherein:

FIG. 1 is a view showing portions of two sections of pipeline in an irrigation system detachably connected together through couplers provided at the ends of the sections of pipeline;

FIG. 2 is a view, on a larger scale, partly in section, illustrating in greater detail the connection between two pipeline sections;

FIG. 3 illustrates the manufacturing process employed in making a press-fit joint between a coupler and the end of a length of pipe to produce a section of pipeline;

FIG. 4 is a cut-away perspective view of a modified form of sheathing element used in mounting a coupler; and FIG. 5 is an elevation view, on a reduced scale, of another form of sheathing element.

DETAILED DESCRIPTION

Turning now to the drawings, and first of all more particularly to FIG. 1, two adjoining lengths of pipe forming part of the pipeline in an irrigation system are indicated at 10 and 12. These lengths of pipe customarily are made of aluminum to minimize weight and thus to facilitate field handling. Each of the pipe lengths 10, 12 is joined at opposite ends to pipe couplers shown at 14 and 16. A pipe length together with the couplers joined to its opposite ends constitutes a section of irrigation line, and it is these sections which are disconnected from each other when dismantling the system.

Couplers 14 and 16 are similar in configuration. The principal difference between the two is that coupler 16 includes a threaded outlet 20 (for receiving a sprinkler standpipe 22), and a drain valve mechanism 24, which elements are not present in coupler 14.

Couplers 14, 16 may each comprise a one-piece aluminum casting. Each coupler includes an elongate tubular portion 28 at one end, and a flange portion 30 integral with portion 28 having a face lying in a plane normal to the axis of portion 28. A multiplicity of teeth 32 are cast into the face of a flange portion with these distributed uniformly about the circumference of the flange portion.

In the coupled-together condition illustrated in FIGS. 1 and 2, coupler 14 at the end of one section of line and coupler 16 at the end of an adjacent section of line are disposed with their flange portions face to face, and with teeth 32 of the flange portions intermeshed. Holding the couplers 14, 16 together (and thus uniting the sections of pipeline which include these couplers) is a releasable clamp 26 which envelopes flange portions 30 presented by the interfitted couplers. An elastomeric sealing ring 34 is disposed between the confronting faces of the coupler's flange portions (such being positioned inwardly of teeth 32) to inhibit leakage between the couplers.

In the manufacture of a section of pipeline, a coupler is united to the end of the pipe length which receives it by a press-fit joint, shown at 18.

It will be noted that tubular portion 28 in a coupler, and referring to FIG. 3, is substantially cylindrical and thus has a substantially uniform outer diameter throughout a region 28a comprising a major portion of the length of the tubular portion. The outer end of the tubular portion, i.e., the end remote from flange portion 30, in a region 28b, has a slightly inwardly tapered outer profile, and as a result, the extreme outer end of the tubular portion has an outer diameter which is somewhat less than the diameter of the tubular portion in region 28a.

In making joint 18, a length of pipe is selected which has an inner diameter which is somewhat less than the outer diameter of tubular portion 28 in region 28a. The joint is prepared by forcing an end portion of the length of pipe, such as is shown at 12a in FIG. 3, over the tubular portion, with this end portion of the pipe enlarging to accommodate the somewhat greater outer diameter of the tubular portion. The slightly tapered end region 28a in the tubular portion facilitates placing of the end of the pipe length over the tubular portion as a preliminary to forcing the length of pipe into a finally seated position.

Prior to making the press-fit joint, a sheathing element 36 is mounted on the end of the length of pipe. Referring to FIG. 3, which illustrates the end of a length of pipe and portions of a coupler prior to the making the press-fit joint, the sheathing element 36 includes a tubular inner portion or skirt 36a, which fits snugly within end portion 12a of the pipe length. Integral with this skirt portion 36a is a rim portion 36b which rests against the end edge of the length of pipe, and a turned-over outer portion or lip 36c. The sheathing element is fabricated from a suitable thin gauge material, selected so as to be free of any galling tendency when moved under high pressure over the coupler which receives it in the completed press-fit joint. Suitable materials, in the case of an aluminum coupler, include ferrous alloys such as stainless steel, and synthetic polymeric materials such as Teflon and Delrin.

The material making up the sheathing element ordinarily will have a thickness which is relatively minor compared to the wall thickness of the pipe length on which the sheathing element is mounted. For instance, it is contemplated that the thickness of such material may optimumly be in the range of about 0.002 to 0.008 inch, in sheathing elements employed with pipe lengths having wall thicknesses ranging from about 0.04 to about 0.08 inch.

Describing, for purposes of illustration only, the manufacture of a section of irrigation pipeline, a coupler including a tubular portion having an outer diameter of 4 inches over region 28a thereof, typically might be joined with a length of aluminum pipe having a 4 inch outer diameter and a wall thickness of 0.050 inch. The enlargement which occurs in the inner diameter of the section of the pipe length which seats over region 28a in the completed joint, in the example given, will be equal to twice the indicated wall thickness, or 0.100 inch, plus twice the thickness of the material in the sheathing element employed in making the connection. The sheathing element itself will undergo some enlargement, due to the expansion in the element which must take place when such is moved into position over the tubular portion of the coupler.

With reference to FIG. 4, here a modified form of annular sheathing element is illustrated such as might be employed in the manufacture of a section of irrigation pipeline where it is desired to produce an adhesive bond between the length of pipe and the coupler which receives it. Thus, and referring to FIG. 4, the annular sheathing element partially shown at 38 is provided with a plurality of pockets or cavities 40 distributed circumferentially in skirt portion 38a of the element. An adhesive bonding agent is incorporated with these openings which may be done prior to mounting of the sheathing element on the end of a length of pipe, or after such has been fitted onto the end of the pipe and prior to forcing the sheathed end section of the pipe onto a coupler. The adhesive employed is introduced in an uncured state, and exemplary of adhesives that might be utilized are the so-called epoxy adhesives which are readily available commercially. After press fitting of a sheathed pipe section onto a coupler, setting up or curing of the adhesive takes place, with bonding together of the pipe and tubular portion of the coupler in interfacial regions overlying the openings. The number, size, and shape of the various openings are subject to change depending upon the final results desired.

Another form of sheathing element is illustrated in FIG. 5. In this instance the element comprises an elongate, flat strip 42, again of thin gauge material, having a rolledover outer lip 42a extending along one margin of the strip. The strip has a length substantially equal to the inner circumference of the length of pipe for which the sheathing element is intended to be used. Distributed along the length of the sheathing elements are pockets 44 performing the function of pockets 40 described in connection with the modification of the invention shown in FIG. 4. The ends of the strip are notched or stepped, whereby a notch 46 and a tab 48 are presented at one end of the strip, and a notch 50 and tab 52 are presented at the opposite end of the strip.

In mounting the element on the end of a pipe, the element is deformed into an annular or cylindrical configuration with bringing of the ends of the strips together, and the annular body so produced may then be mounted on the end of a length of pipe in much the same manner as element 38 already discussed. When bringing the ends of the strip together, tab 52 fits within mating notch 46, and tab 48 mates with and fits within notch 50. It is also contemplated that an adhesive may be provided between the interfacing edges of the interfitting tabs and notches. When mounted in place, portion 42b of the element becomes a skirt bounding the inner circumference of the length of pipe, and lip 42a extends about the outer circumference of the pipe.

It should be noted here that in making a press-fit joint using conventional approaches, the incorporation of an adhesive into the joint has not been entirely satisfactory since any press fitting of a pipe onto a coupler tends to produce wiping away of any adhesive applied as a coating on one or the other of the parts. By the inclusion of the pockets described this wiping away of any adhesive residing in the pockets is inhibited.

While preferred embodiments of the invention have been described herein, it should be obvious that modifications and variations are possible without departing from the invention as such is defined by the claims set forth below.

It is claimed and desired to secure by Letters Patent:

1. A method of making a rigid press-fit joint between a pipe and a coupler for the pipe where the coupler has a tubular portion of greater outer diameter than the inner diameter of the pipe comprising
providing a sheathing element having an annular portion sized to fit closely within an end of said pipe, said annular portion including means defining openings therein, said sheathing element further including a radially outwardly projecting rim portion joined to said annular portion and a turned over outer lip portion joined to said rim portion,
mounting said sheathing element on said end of said pipe with said annular portion received within and bounding the inner circumference of said pipe and said openings then forming pockets along the inner surface of said pipe, said rim portion becoming located adjacent the end edge of said pipe and said lip portion becoming located around the outer circumference of said pipe, incorporating a bonding agent into said openings whereby such resides within said pockets with said sheathing element mounted in place, forcing the pipe with the sheathing element mounted thereon and with the bonding agent residing in said openings onto the tubular portion of the coupler with sufficient pressure whereby the sheathed end of the pipe moves over the tubular portion of the coupler to envelope said tubular portion and with the sheathed pipe end enlarging in diameter, said sheathing element provides means for inhibiting galling between said pipe and coupler during said forcing, and curing said adhesive to bond the pipe and tubular portion together.

2. The method of claim 1, wherein said pipe and coupler are of a metal selected from the group consisting of aluminum and titanium and alloys thereof, and said sheathing element comprises means for inhibiting galling between said pipe and coupler during said forcing step.

3. The method of claim 1, wherein said bonding agent is an epoxy adhesive.

4. The method of making a rigid press-fit joint between a first tubular member having a certain inner diameter and a second tubular member having an outer diameter greater than said inner diameter, the method comprising placing a sheathing element on one of said members where such element includes an opening carrying a bonding agent, forceably positioning the first tubular member over the second tubular member with such positioning deforming the first tubular member, the placing of the sheathing element, becoming the bonding agent in the opening, being such as to position the element between the first and second tubular members during positioning of the first tubular member over the second tubular member, the positioning of the first tubular member over the second tubular member being effective to carry the bonding agent in said opening into a region between said first and second members, said sheathing element provides means for inhibiting galling between said first tubular member and said second tubular member during the forcing, and curing the adhesive to bond the two members together.

5. A method of making a rigid press-fit joint between an end of a first tubular member having a certain inner diameter and an end of a second tubular member having an outer diameter greater than said inner diameter, the method comprising, providing a sheathing element having an elongate annular portion sized to fit closely within the end of said first member, with said sheathing element further including a radially outwardly projecting rim portion joined to said annular portion and a turned over outer lip portion joined to said rim portion, sheathing the end of said first member by mounting said sheathing element on said end of said first member with said annular portion received within the member and bounding the inner circumference thereof and with said rim portion adjacent the end edge of the member and said lip portion bounding the outer circumference of the member, and forcing the sheathed end over the end of said second member with sufficient force whereby the sheathed end enlarges to accommodate the outer diameter of the second member and moves over the end of the second member to envelope the latter whereby said sheathing element provides means for inhibiting galling between said first tubular member and said second tubular member during said forcing.

6. The method of claim 5, wherein said first member comprises an aluminum pipe, said second member comprises a tubular portion in an aluminum coupler.

7. A method of making a rigid press-fit joint between the ends of first and second tubular members where the inside of the end of the first member with enlargement thereof is forced over the outside of the end of the second member to produce a press fit, the method comprising providing a sheathing element having an elongate annular portion sized to fit closely about one of said sides with said sheathing element further having a radially projecting rim portion integral with said annular portion and a lip portion joined to said rim portion, mounting said sheathing element on the end of said member having said one of said sides with said annular portion bounding said one of said sides and with said rim portion adjacent the end edge of the member and said lip portion bounding the other side of this member, and forcing the end of the first member over the end of the second member with such forcing serving to enlarge the diameter of the first member whereby it accommodates the diameter of the second member and said annular portion during such forcing riding between the inside of the first member and the outside of the second member, whereby said sheathing element provides means for inhibiting galling between said first and second tubular members during said forcing step.

* * * * *